US008386523B2

(12) United States Patent
Mody et al.

(10) Patent No.: US 8,386,523 B2
(45) Date of Patent: Feb. 26, 2013

(54) RANDOM ACCESS AUDIO DECODER

(75) Inventors: Mihir Narendra Mody, Maharashtra (IN); Ashish Jain, Gwalior (IN); Ajit Venkat Rao, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1425 days.

(21) Appl. No.: 11/292,882

(22) Filed: Dec. 2, 2005

(65) Prior Publication Data

US 2006/0149531 A1 Jul. 6, 2006

Related U.S. Application Data

(60) Provisional application No. 60/640,374, filed on Dec. 30, 2004.

(51) Int. Cl.
*G06F 7/00* (2006.01)

(52) U.S. Cl. ......................... 707/793; 707/781; 711/105

(58) Field of Classification Search .................. 704/500, 704/503; 707/705, 793, 792, 781; 711/105
See application file for complete search history.

(56) References Cited

U.S. PATENT DOCUMENTS

| | | | | |
|---|---|---|---|---|
| 6,355,872 | B2 * | 3/2002 | Park et al. | 84/609 |
| 6,906,643 | B2 * | 6/2005 | Samadani et al. | 340/995.18 |
| 2003/0002482 | A1 * | 1/2003 | Kubler et al. | 370/352 |
| 2006/0064716 | A1 * | 3/2006 | Sull et al. | 725/37 |
| 2009/0010503 | A1 * | 1/2009 | Mathiassen et al. | 382/125 |

* cited by examiner

*Primary Examiner* — Robert Beausoliel, Jr.
*Assistant Examiner* — Alexandria Bromell
(74) *Attorney, Agent, or Firm* — Mirna Abyad; W. James Brady; Frederick J. Telecky, Jr.

(57) ABSTRACT

Random access decoding start points (audio frame headers) for AMR-type files are found by sequential elimination of types of file points from consideration for a block of file points following a random access selected point. Chaining of file points according to frame header format interpretation gives paths of points through the block, and selection of maximal path(s) includes sums of weights of the points of a path. The next-to-initial points of such a maximal path provides a decoding start point.

2 Claims, 14 Drawing Sheets

CS

CS1

CS2 first path weight 10.3 second path weight 4 third path weight 10.3 fourth path weight 8 fifth path weight 8 sixth path weight 2.3 two maximal weight paths:
their nodes define CS3

CS4

Figure 8 (prior art) AMR file
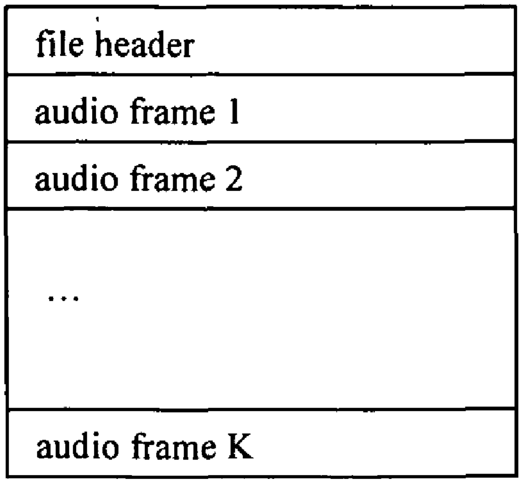

Figure 9 (prior art) audio frame

| | | | | | | | | |
|---|---|---|---|---|---|---|---|---|
| P | FT | | | | Q | P | P | Audio frame header byte: (FT decodes to N from table) |
| bit0 | bit1 | bit2 | bit3 | bit4 | bit5 | bit6 | bit7 | Audio frame first data byte |
| bit0 | bit1 | bit2 | bit3 | bit4 | bit5 | bit6 | bit7 | Audio frame second data byte |
| .... | | | | | | | | |
| bit0 | bit1 | bit2 | bit3 | bit4 | bit5 | bit6 | bit7 | Audio frame Nth data byte |

RANDOM ACCESS AUDIO DECODER

CROSS-REFERENCE TO RELATED APPLICATIONS

This application claims priority from provisional patent application No. 60/640,374, filed Dec. 30, 2004.

BACKGROUND

The present invention relates to digital audio playback, and more particularly to random access in decoding audio files.

Traditionally, speech coder/decoders (codecs) are used for two-way real-time communication to reduce bandwidth requirements over limited capacity channels. Examples include cellular telephony, voice over internet protocol (VoIP), and limited-capacity long-haul telephone communications using codecs such as the G.7xx series (e.g., G.723, G.726, G.729) or AMR-NB and AMR-WB (Advanced multi-rate narrow band and wideband). In recent years new applications have used speech codecs to compress audio data for storage and playback at a later time; this contrasts with the original two-way real-time communication codec design. Specifically, AMR-NB and AMR-WB speech codecs originally intended for cellular telephony are being increasingly used for audio compressed storage. For example, using such a method, live audio (and optionally video also) can be recorded using a cell phone for forwarding and sharing with other cell phone users.

Applications such as these are expected to be regular features in 3G cell phones connected to the GSM network. The 3GPP standards body has defined the evolution of the GSM network and services to address these applications and has specified the Adaptive Multi-Rate (AMR) family of codecs as mandatory for encoding and decoding of audio.

There are two flavors of AMR:

- Narrowband (AMR-NB) supporting sampling frequency of 8 KHz and bit rates ranging from 4.65 kbps to 12.2 kbps.
- Wideband (ARM-WB) supporting sampling frequency of 16 KHz and bit rates ranging from 6.6 kbps to 23.85 kbps.

Originally, the primary purpose of the AMR codecs was speech coding for real-time communication to reduce bandwidth requirements in cell phones. AMR offers high quality at low bit rates, and thence reduced storage requirements if used in a non-real-time storage scenario. AMR has the advantage of greatly reduced complexity as compared to popular audio encoders such as MP3/AAC. As a result, AMR is the preferred codec for recording and playback of audio in 3G cell phones; although, AMR-NB is primarily for speech.

Traditionally, speech standards (including AMR) define the bit syntax for transmission purposes. The input audio is typically divided into fixed-length frames and a variable number of bits are used to specify the encoded data in each frame. AMR is an algebraic code-excited linear-prediction (ACELP) method with the differing bit rates reflecting the total number of bits allocated to the frame parameters (LP coefficients, pitch, excitation pulses, and gain).

Since storage is almost never a primary goal during standardization, typically the speech codec standards do not specify the file format that must be used wherever the codec is used in a storage application. However, for some specific speech codecs, simple file storage formats have been defined. One important example is the AMR file format specified by the Internet Engineering Task Force (IETF) RFC 3267, which has been adopted by 3GPP. IETF RFC 3267 defines file storage formats for AMR NB and AMR WB codecs. The basic structure of an AMR file is shown in FIG. 8. The AMR data format specified in RFC 3267 has the following properties:

- The data in each audio frame is composed of two concatenated components: (i) a "frame header" which indicates the length of the audio payload in the frame and (ii) the audio payload. Note that the size of the audio payload is variable.
- There are no synchronization symbols indicating the start of each individual AMR frame.

These properties lead to the following problems for playback applications:

- The AMR file has to be played sequentially from start to end. There are no random access points (e.g., synchronization symbols) in the recorded audio file. This prevents the user from starting the audio playback from any arbitrary time instant (e.g., time proportional to a fraction of file size).
- It is not possible to easily fast forward or rewind through the audio file.

To summarize, given an arbitrary starting point in the file, it is impossible to decode the file correctly without performing sequential decoding starting from the first frame in the file.

As a result of the foregoing problems, many 3G phone manufacturers are forced to disable useful features such as playback starting from an arbitrary point as well as fast forward/rewind of audio.

SUMMARY OF THE INVENTION

The present invention provides a random access method for a sequence of encoded audio frames starting from a selected random access point by successive eliminations of points as possible starting points.

BRIEF DESCRIPTION OF THE DRAWINGS

FIG. 8 shows AMR file structure.

FIG. 9 shows audio frame structure.

DETAILED DESCRIPTION OF THE PREFERRED EMBODIMENTS

1. Overview

Figure 1:
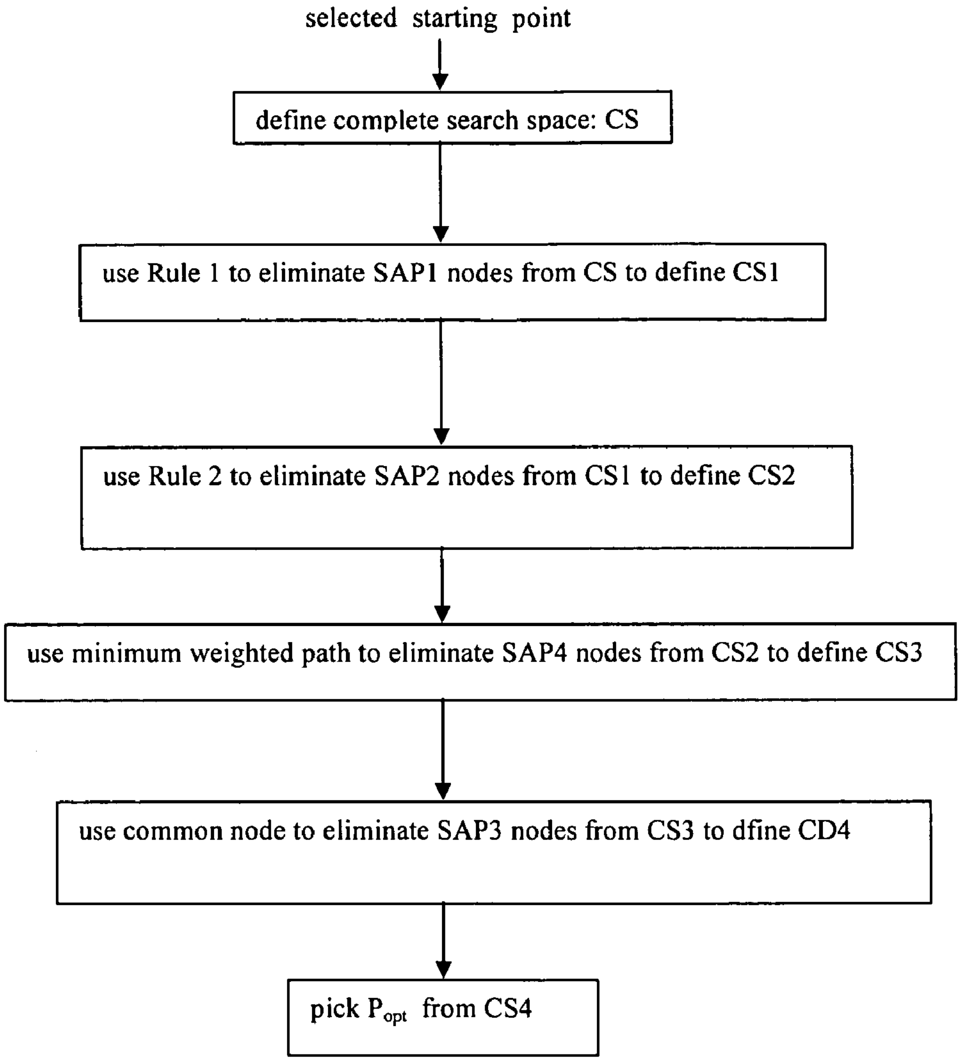
FIG. 1 is a flow diagram for a first preferred embodiment method.

Preferred embodiment methods of random access into an AMR file use a successive node (byte) analyses to eliminate possible audio frame headers and then deem the first of the remaining audio frame headers and the start of the random access playback. FIGS. 2-7 heuristically illustrate the successive eliminations of nodes in a sequence of audio frames.

Preferred embodiment systems perform preferred embodiment methods with digital signal processors (DSPs) or general purpose programmable processors or application specific circuitry or systems on a chip (SoC) such as both a DSP and RISC processor on the same chip with the RISC processor controlling. A stored program in an onboard ROM or external flash EEPROM for a DSP or programmable processor could perform both the frame analysis for random access and the signal processing of playback. Analog-to-digital converters and digital-to-analog converters could provide coupling to the real world, and modulators and demodulators (plus antennas for air interfaces) provide coupling for transmission waveforms.

2. AMR File Format

Initially, consider the file format for AMR-NB and AMR-WB files according to the Internet engineering task force (IETF) Request for Comments (RFC) 3267. In both cases, the file is organized as in FIG. 9 with a file header that is followed by audio frames organized consecutively in time.

The data in each frame is stored in a byte-aligned format. Specifically, the audio payload data in each frame is padded with zeros to ensure that the total number of resulting bits is a multiple of 8. Further, the audio payload data in each frame is preceded with a 1-byte header whose format is shown in FIG. 9. The bits in the frame header are defined as follows:

Bit 0: P, a padding bit which must be set to 0.

Bits 1-4: FT, the frame type index which indicates the "frame type" of the current frame. Both AMR-NB and AMR-WB allow a fixed number of frame types. Given knowledge of whether the NB or WB codec was used and the frame type, one can directly determine the length of the audio payload in the frame. The following Tables show the relationship between the frame type and the frame size for AMR-NB and AMR-WB.

Bit 5: Q, the frame quality indicator. If Q is set to 0, this indicates the corresponding frame is damaged beyond recovery.

Bits 6-7: P, two more padding bits which must each be set to 0.

Frame type and corresponding frame size for AMR-NB:

| | Frame type | | | | | | | | | |
|---|---|---|---|---|---|---|---|---|---|---|
| | 0 | 1 | 2 | 3 | 4 | 5 | 6 | 7 | 8 | 15 |
| Frame size | 13 | 14 | 16 | 18 | 20 | 21 | 27 | 32 | 6 | 1 |

Frame type and corresponding frame size for AMR-WB:

| | Frame type | | | | | | | | | | | |
|---|---|---|---|---|---|---|---|---|---|---|---|---|
| | 0 | 1 | 2 | 3 | 4 | 5 | 6 | 7 | 8 | 9 | 14 | 15 |
| Frame size | 18 | 24 | 33 | 37 | 41 | 47 | 51 | 59 | 61 | 6 | 1 | 1 |

The problem with random access is simple: decoding must begin at a frame header, but even if bits 1-4 of a byte define one of the allowed frame types and bits 0 and 5-7 are 0, 1, 0, and 0, the byte need not be a frame header. Indeed, for a random audio data byte, the bits will look like a frame header with probability 10/256 for AMR-NB or 12/256 for AMR-WB. Thus finding a frame header takes more than just finding a byte with a proper set of bits.

3. Preferred Embodiment AMR File Access

The first preferred embodiment methods essentially make successive passes through an interval of bytes (points) following a requested access point and on each pass eliminate bytes as possible frame headers; after the final pass the first byte of the remaining bytes is picked as the initial frame header at which to start decoding. The methods can be conveniently described in terms of the following definitions:

Search point (P): an arbitrary byte-aligned position in an AMR file. A search point is completely defined by two attributes: its position in the file and the value of the 8-bit data it points to. Search points are also referred to as nodes or points in the following.

Random Access point (RAP): a search point that corresponds to the frame header of an audio frame.

Sequential Access point (SAP): a search point that does not correspond to the frame header of an audio frame.

Search space (S): a collection of search points which may contain RAPs and SAPs.

Complete Search space (CS): a search space (S) which contains at least one random access point (RAP).

Parent node: if node1 (search point 1) leads to node2 (search point 2), then node1 is considered to be a parent of node2. That is, if bits 1-4 of node1 are interpreted as an FT, then using the appropriate foregoing table the frame size is the number of bytes after node1 where node2 is located.

In terms of these definitions, the random access problem can be summarized as follows: determine the first random access point (RAP) in an arbitrarily-specified complete search space (CS) in the AMR file. And the first preferred embodiment method for random access is based on the successive reduction of a complete search space (CS) to identify the first RAP ($P_{opt}$). FIG. 1 is a high-level illustration of the approach. Initially, the search space CS contains N search points. After iterating the first time, the method reduces the search space CS to search space CS1 containing N1 points (where N1 is less than N). The iterations are continued until $P_{opt}$ is found.

Before describing the method further, it is useful to observe that any RAP must satisfy the following important rules:

Rule 1: the 8-bit data corresponding to a RAP can only take on one of 10 values in the case of an AMR-NB file and only one of 12 values in the case of an AMR-WB file because only the four bits making up FT are not set, and the FT bits can only have 10 or 12 values as shown in the foregoing tables.

Rule 2: if a specific search point is a RAP, then jumping ahead in the file by the length of the appropriate frame length (determined from the frame type and the appropriate table) must yield another RAP.

Note that Rules 1 and 2 hint at an approach that is referred to as "chaining"; namely, a RAP must necessarily satisfy the following condition: if you start from a RAP, jump ahead in the file by a step corresponding to the appropriate frame size (deduced from FT), and continue the process until you reach the end of the CS, you must consistently "hit" RAPs which satisfy Rule 1.

Given an arbitrarily specified contiguous and complete search space, CS, one can classify the SAPs in that space into four distinct categories: SAP1, SAP2, SAP3, SAP4 defined as follows and illustrated in FIG. 2.

SAP1: these SAPs do not fulfill Rule 1; that is, they do not have the format of a RAP.

SAP2: these SAPs satisfy Rule 1 but not Rule 2; that is, the FT bits decode to a length that jumps to a non-RAP.

SAP3: these SAPs satisfy both Rule 1 and Rule 2; however, they are really not RAPs themselves. Instead, via the process of "chaining", they jump to RAPs.

SAP4: these SAPs satisfy both Rule 1 and Rule 2; however, they are not RAPs. Moreover, through the process of "chaining", they only jump to other SAP4*s*.

FIG. 1 is a flow diagram for a first preferred embodiment method which includes the following steps that will be explained after the listing of the steps.

(1) Define a complete search space, CS.

(2) Eliminate SAP1 from CS and form CS1.

(3) Eliminate SAP2 from CS1 and form CS2.

(4) Eliminate SAP4 from CS2 and form CS3.

(5) Eliminate SAP3 form CS3 and form CS4.

(6) Pick $P_{opt}$ from CS4.

Description of Preferred Embodiment Method (1) Definition of the CS

The complete search space (CS) is a search space which contains at least one RAP. To ensure that a given search space is complete, one must pick a search space that is at least equal to the size of the longest possible AMR-NB or AMR-WB frame. On possible example is to choose a frame length equal to the worst-case frame length; this length (denoted N) is 32 bytes for AMR-NB and 61 bytes for AMR-WB. Choosing these lengths will ensure that the search space is complete. However, using a longer search space (e.g., 400 bytes or about a half second of audio) will significantly reduce the probability of choosing an incorrect RAP, and the first preferred embodiment method takes 400 bytes.

(2) Elimination of SAP1 Points by Rule 1 Application

Apply Rule 1 to eliminate SAP1 points from the CS search space (containing N points) to yield new complete search space CS1 (containing N1 points with N1 less than N).

In particular, for AMR-NB a given search point has to satisfy the following necessary conditions to avoid being eliminated as an SAP1:

Bits 0, 6, and 7 of a RAP byte should be 0;

Bit 5 of a RAP byte should be 1;

Bits 1-4 of a RAP byte should form a binary integer with value outside the range 8-14; that is, the bits should be one of 0000 to 0111 or 1111.

Similarly, for AMR-WB a given search point has to satisfy the following necessary conditions to avoid being eliminated as an SAP1:

Bits 0, 6, and 7 of a RAP byte should be 0;

Bit 5 of a RAP byte should be 1;

Bits 1-4 of a RAP byte should form a binary integer with value outside the range 10-13; that is, the bits should be one of 0000 to 1001 or 1110 to 1111.

Figure 2:
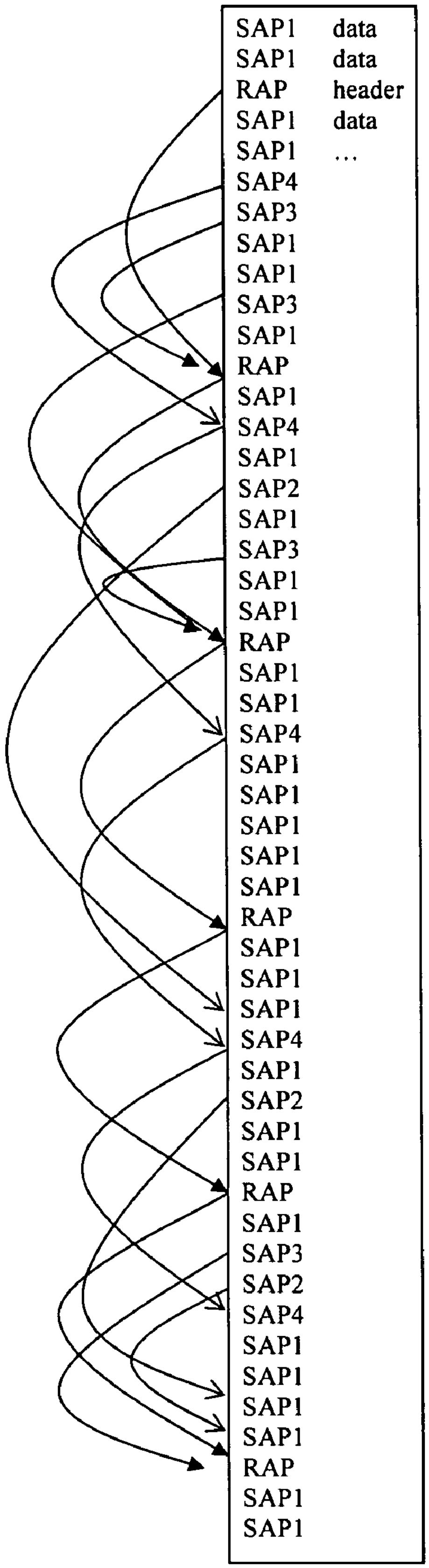
FIGS. 2-7 heuristically illustrate search spaces for preferred embodiment methods.
Figure 3:
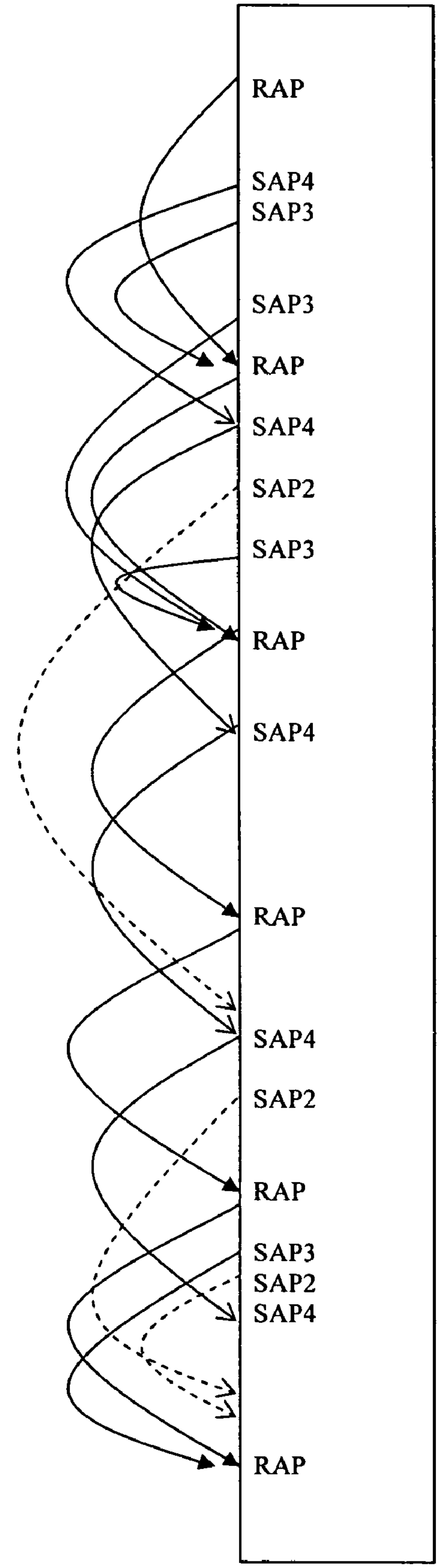

FIG. 2 shows a heuristic example of a sequence of frame header and audio data bytes with arrows jumping from bytes with RAP format (RAP, SAP2, SAP3, and SAP4) to other bytes where the jump length equals the decoded FT bits of the RAP format byte. Note that FIG. 2 has many fewer SAP1*s* than a typical file; this simplifies the figures for clarity of explanation. SAP1*s* do not have the RAP format and thus no arrows jump from SAP1*s*; however, SAP2*s* have arrows jumping to SAP1*s*. FIG. 3 shows the same bytes after removal of the SAP1*s*.

(3) Elimination of SAP2 Points by Rule 2 Application

The reduced search space CS1 contains search points which must satisfy Rule 1. Next, apply Rule 2 (Rule 1 plus Rule 2 effectively constitute chaining) to eliminate SAP2 points. If a given point is an RAP, then jumping ahead based on the frame type (FT) field of a RAP will lead to the next RAP. The amount of jump depends upon the frame type. The chain property is tested for all points in CS1; the points (SAP2*s*) that lead to SAP1*s* will be removed from CS1 and reduce it to CS2 containing N2 points with N2 less than N1.

Figure 4:
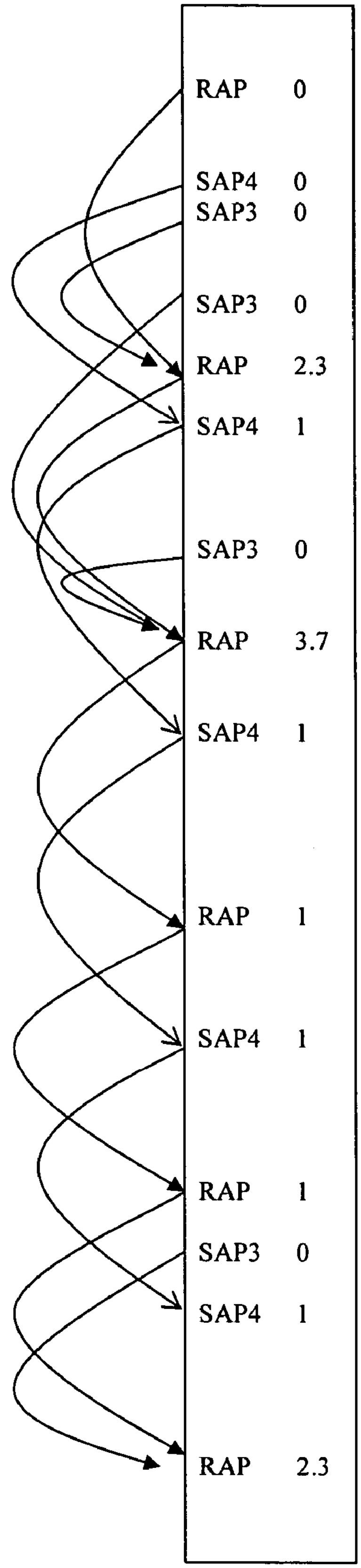
Figure 5A:
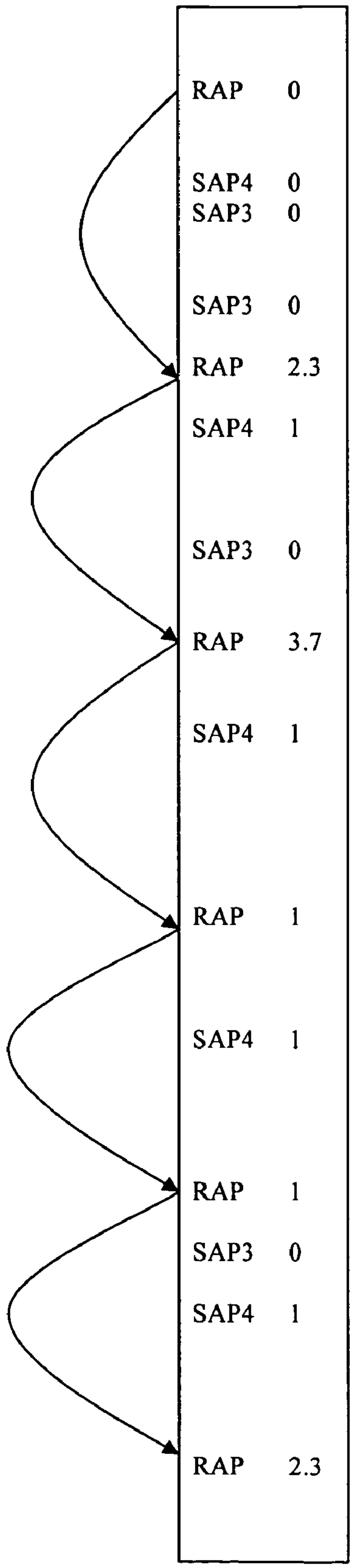
Figure 5B:
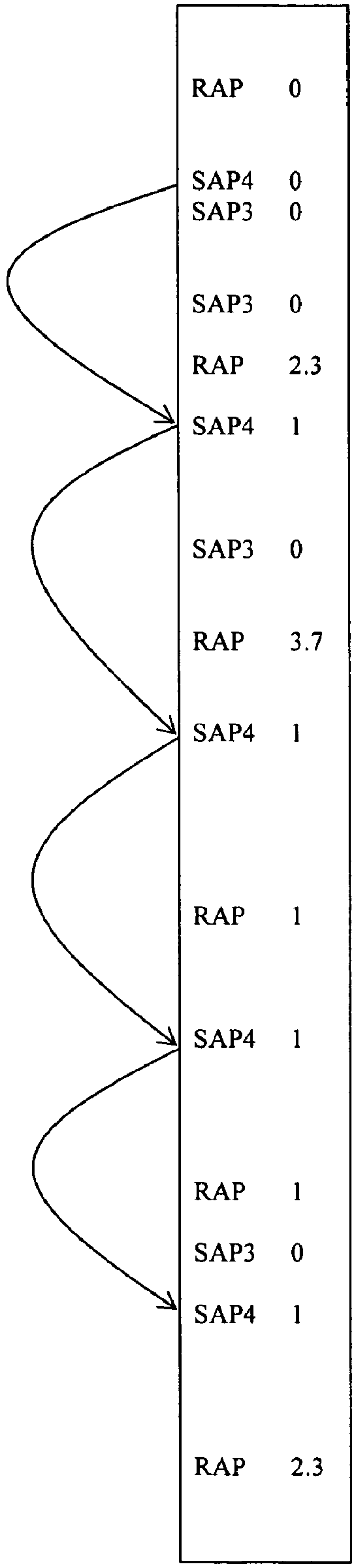
Figure 5C:
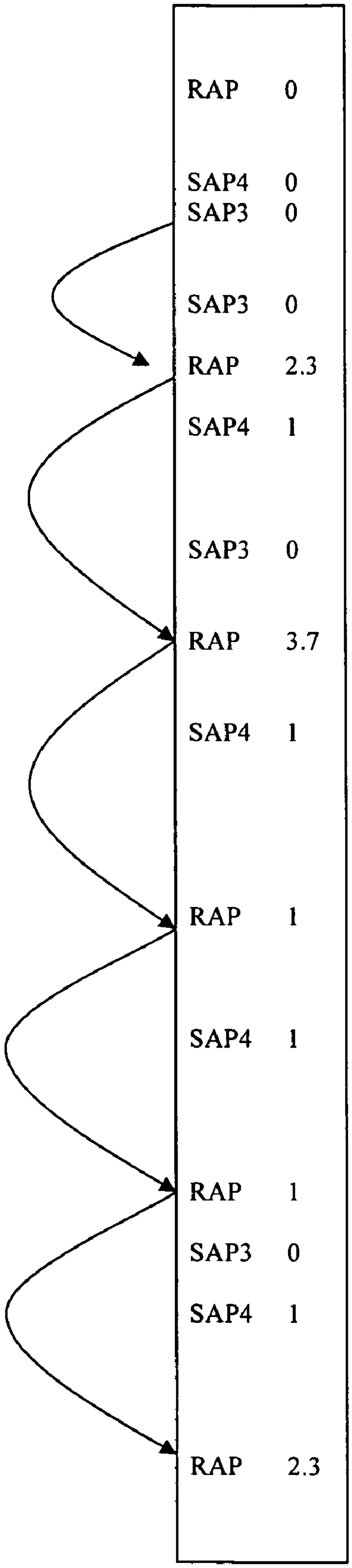
Figure 5D:
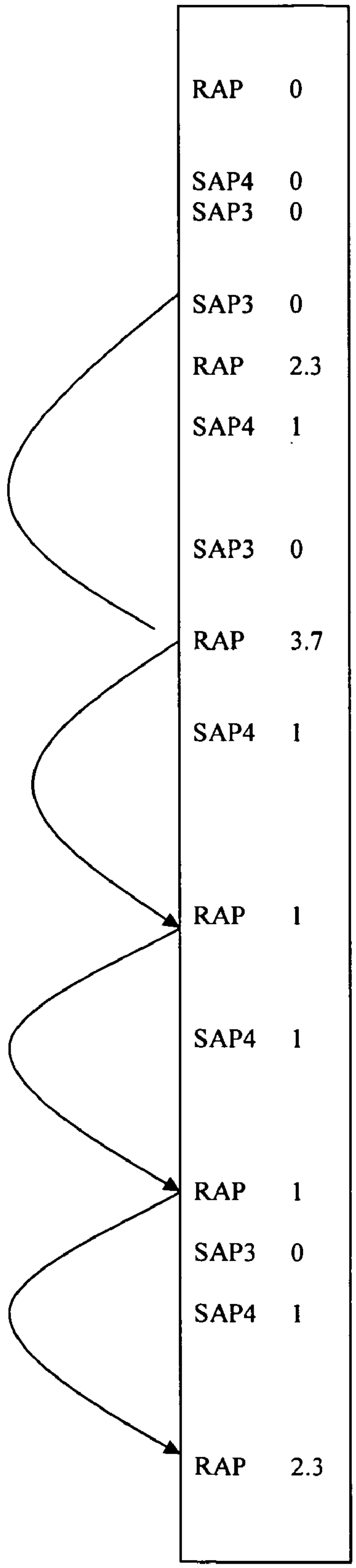
Figure 5E:
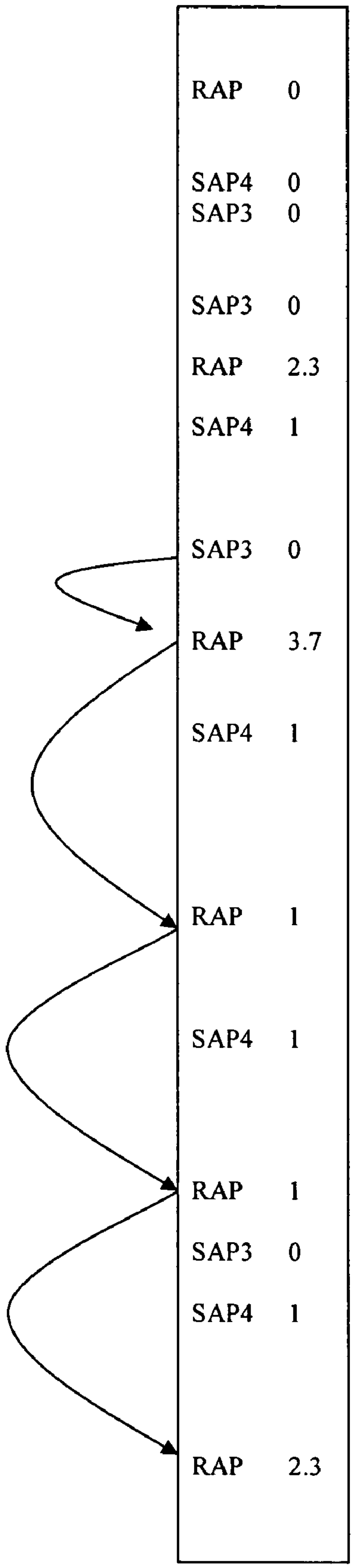
Figure 5F:
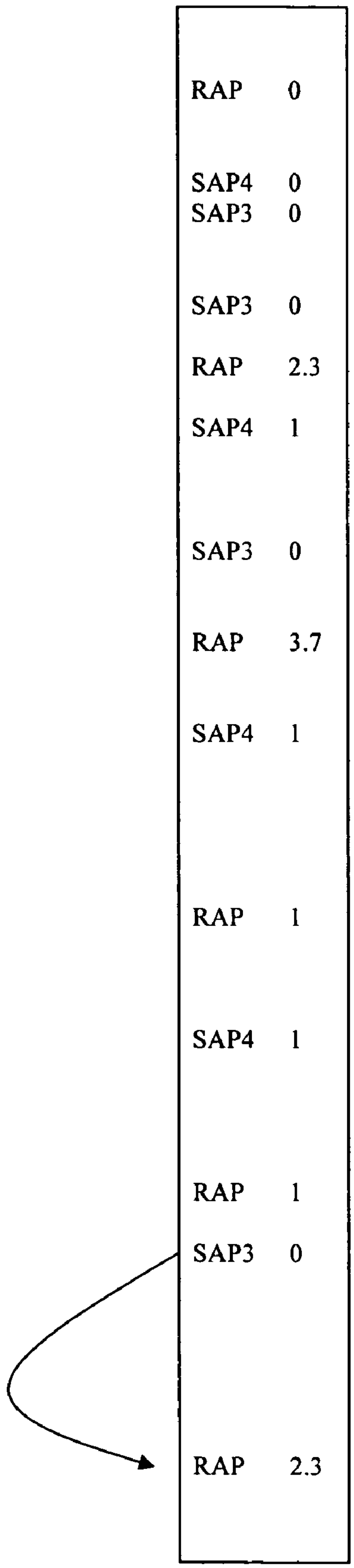

FIG. 3 shows CS1 with the SAP2 points having broken line arrow jumps, and FIG. 4 shows CS2 with the SAP2 points removed.

(4) Elimination of SAP4 Points by Maximal Weighted Paths

The SAP4 points are removed by application of the maximum weighted path (MWP) method which operates as follows.

(a) Order all points in CS2 in increasing order depending upon the position of points in the file (FIG. 4 shows this with increasing position from top to bottom);

(b) For each point in CS2, calculate the weight of the point (node) based on the number of parent nodes that the given node using the following tables:

Node weights for AMR-NB:

| | Number of parent nodes | | | | | | | | | | |
|---|---|---|---|---|---|---|---|---|---|---|---|
| | 0 | 1 | 2 | 3 | 4 | 5 | 6 | 7 | 8 | 9 | 10 |
| Weight of NB node | 0 | 1 | 2.3 | 3.7 | 5.2 | 6.8 | 8.6 | 10.5 | 12.5 | 14.7 | 17.1 |

Node weights for AMR-WB:

| | Number of parent nodes | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| Weight of WB node | 0 | 1 | 2.3 | 3.7 | 5.2 | 6.8 | 8.6 | 10.5 | 12.5 | 14.6 | 16.8 | 19.1 | 21.8 |

(FIG. 4 has the weights shown to the right of each node.)

Figure 6:
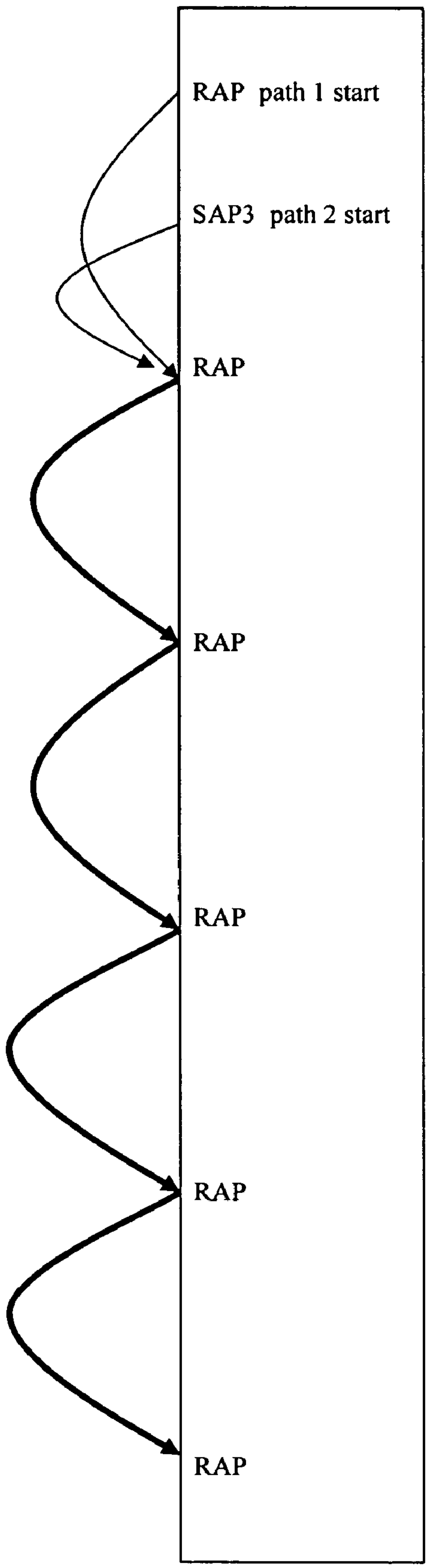

(c) For each point in CS2, create the "chained path" that connects the given point to other point(s) in CS2 by the jumps (in FIG. 4 a chained path consists of a set of arrows connected head to tail extended in both directions; there are six paths for CS2 and are separately illustrated in FIGS. 5*a*-5*f*);

(d) For each path, calculate the path weight as the sum of the weights of all of the nodes along the path (calculated total weight for each of the six paths of FIGS. 5*a*-5*f* appear in the figure captions);

(e) Choose the path(s) with the maximum weight; the nodes of these paths form CS3. (FIG. 6 illustrates CS3 and the two maximal weight paths from FIGS. 5*a* and 5*c*; note that these two paths overlap except for their first nodes, and the thicker arrows indicate this overlap.)

The foregoing weight tables are based on the probability of occurrence of a node with a given number of parents in completely random data. The weight of a node is proportional to the logarithm of the inverse of its probability of occurrence. Indeed, if the number of possible parents of a given node is n, then the probability of occurrence of k parents for this node is:

$$P(k) = (1/256)^k (255/256)^{n-k} n!/k!(n-k)!$$
$$= (255/256)^n (n!/k!(n-k)!)/255^k$$

because each of the n possible parents has a probability of 1/256 of being a byte with the RAP format and correct FT to jump to the given node. Note that $(255/256)^n$ is close to 1 for n=10, 12; thus ignore this factor for simplicity. Then the weight for a node with k parents is proportional to log [(n!/k!(n−k)!)/$255^k$]. For convenience, normalize the weights so that a node with 1 parent has weight equal to 1; thus the weight for a node with k parents is:

$$w(k)=\log\,[(n!/k!(n-k)!)/255^k]/\log\,[n/255]$$

The AMR-NB and AMR-WB tables follow from setting n=10 and 12, respectively.

The use of weights on the nodes of a path emphasizes paths with branching, and this emphasizes RAPs because every RAP (except the first one) must have a parent RAP; thus the probability of a RAP having k parents is comparable with a random SAP having k−1 parents. Note that Rule 1 and Rule 2 do not relate to parent nodes, but rather to a node's format and to its children nodes, respectively.

(5) Elimination of SAP3s by Common Node Method

The SAP3s are eliminated using the common node method as follows; this method essentially sacrifices an initial RAP of a maximal weight path in order to eliminate any initial SAP3:

(a) Order all points of CS3 by increasing position as in the AMR file.

(b) For each point in CS3, create a path whose next node is placed at a frame size apart (the FT value jump). The paths can contain nodes outside of CS3 (i.e., path-ending node), but all starting nodes of paths should be from CS3.

Figure 7:
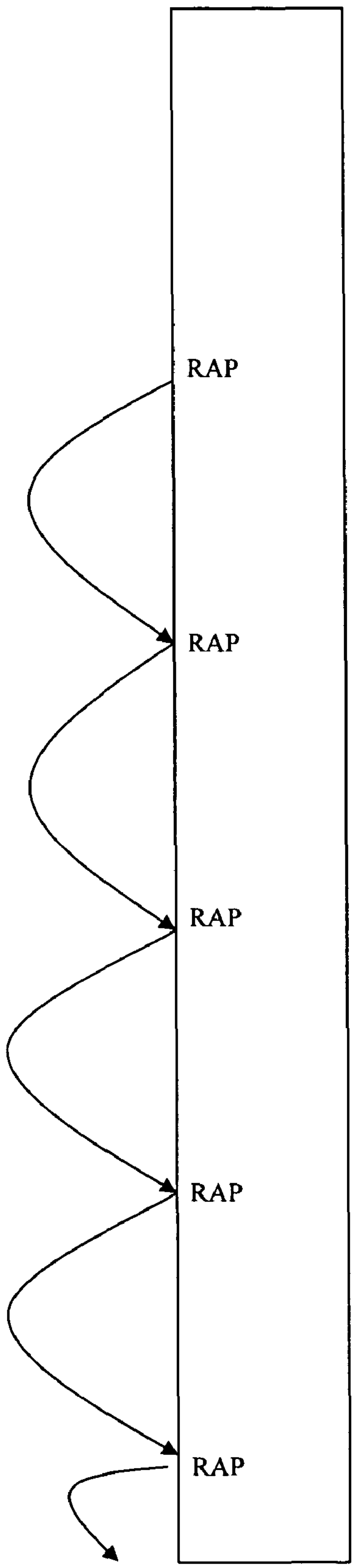

(c) For each node in CS3, remove the nodes which appear in only one path; the remaining nodes then define CS4. (FIG. 7 shows the removal of the two single path nodes of FIG. 6 together with the path beginning at the last RAP and ending outside of CS3.)

(6) Selection of $P_{opt}$ from CS4

The decoding starting point, $P_{opt}$, is selected from CS4 as follows:

(a) Order all points of CS4 by increasing position as in the AMR file.

(b) Pick the first point in CS4 as $P_{opt}$.

After finding $P_{opt}$, reset the AMR decoder and begin decoding at $P_{opt}$, which should be a RAP frame header and should be within one or two frames of the original selected random starting time.

4. Alternative Preferred Embodiment Methods

The RAPs in a sequence of audio frames of an AMR file form a single chained path extending through the entire sequence of audio frames, and this path has maximal length which could be used to detect the RAPs. In particular, an alternative preferred embodiment proceeds as in the foregoing steps (1)-(3) to eliminate the SAP1s and SAP2s. Then modify step (4) by replacing path weight by path overall length (number of bytes between the first and last nodes of the path). This path length approach ignores path branching which the maximal path weight emphasizes at the cost of large search space. Step (5) again sacrifices an initial RAP in order to eliminate an initial SAP3. Lastly, step (6) again picks $P_{opt}$ as the first node remaining.

5. Fast Forward/Rewind

Fast Forward and Rewind (backwards fast forward) functions for an encoded audio file (music or speech) decode and play back at a faster-than-normal speed, such as 2-6 times the normal playback speed. However, this simple approach requires 2-6 times more computing power than normal-speed decode and playback. Consequently, alternative approaches which simulate the simple fast forward/rewind have been proposed.

One alternative approach first decodes and plays a short interval of the audio file, such as 1 second; next, it jumps forward 2-6 seconds and decodes and plays another short interval of the audio file; this is repeated to move through the audio file. For audio files with variable frame lengths, this alternative approach needs random access after each jump; and preferred embodiment fast forward methods repeatedly use the foregoing preferred embodiment random access methods to find a RAP starting point after a jump.

6. Pause/Resume

Pause and Resume functions provide for interrupting playback of an audio file (music or speech) and then later resuming playback from the point of interruption. For a device such as a 3G phone, the pause/resume functions can be used to pause playback of an audio file (music or speech) in order to receive an incoming phone call; and then after the call is completed, resume playback of the audio file. The audio file playback suspension may just save the current playback point in the audio file (not necessarily a frame header) and replace the audio decoder with the real-time decoder for the phone call. For resumption of the playback, the audio file decoder is reloaded, and the saved playback point is treated as a random access to the audio file, so the preferred embodiment pause and resume use the foregoing preferred embodiment random access to find a RAP to restart the playback.

7. Error Concealment

Preferred embodiment random access methods can also apply to error concealment situations. In particular, if errors are detected and frame(s) erased, then the next RAP for continuing decoding must be found; and the preferred embodiment random access can be used.

8. Modifications

The preferred embodiments can be modified in various ways while retaining the feature of a sequential elimination of points of a sequence of encoded frames with frame headers and variable frame lengths.

For example, other coding methods with variable size frames, such as SMV, EVRC, . . . could be used.

What is claimed is:

1. A method of a signal processor of a random access for a sequence of encoded frames with frames of variable lengths and headers indicating the lengths, comprising:

(a) selecting an access point utilizing successive reduction of a complete search space, wherein said access point is not available in meta-data;

(b) selecting via the signal processor a sequence of points following said access point;

(c) removing points of said sequence which do not have the form of a header, said removing defining a first subset of said sequence of points, wherein said removal eliminates sequential access points;

(d) removing points of said first subset which do not jump to other points of said first subset when said points are interpreted as headers, said removing defining a second subset of said first subset;

(e) chaining points of said second subset into paths using jumps of said points when interpreted as headers;

(f) weighting each of said paths according to the number of other points jumping to points of a path;

(g) selecting ones of said paths with a maximum weighting, said selecting defining a third subset of said second subset; and (h) outputting a point from said third subset as a frame header point corresponding to said requested access point wherein said outputted point is within a data stream.

2. An apparatus for a sequence of encoded frames with frames of variable lengths and headers indicating the lengths, comprising:

(a) means for selecting an access point utilizing successive reduction of a complete search space, wherein said access point is not available in meta-data;

(b) means for selecting via the signal processor a sequence of points following said access point;

(c) means for removing points of said sequence which do not have the form of a header, said means for removing defines a first subset of said sequence of points, wherein said removal eliminates sequential access points;

(d) means for removing points of said first subset which do not jump to other points of said first subset when said points are interpreted as headers, said means for removing defines a second subset of said first subset;

(e) means for chaining points of said second subset into paths using jumps of said points when interpreted as headers;

(f) means for weighting each of said paths according to the number of other points jumping to points of a path;

(g) means for selecting ones of said paths with a maximum weighting, said means for selecting defines a third subset of said second subset; and (h) means for outputting a point from said third subset as a frame header point corresponding to said requested access point wherein said outputted point is within a data stream.

* * * * *